United States Patent Office 3,466,074
Patented Sept. 9, 1969

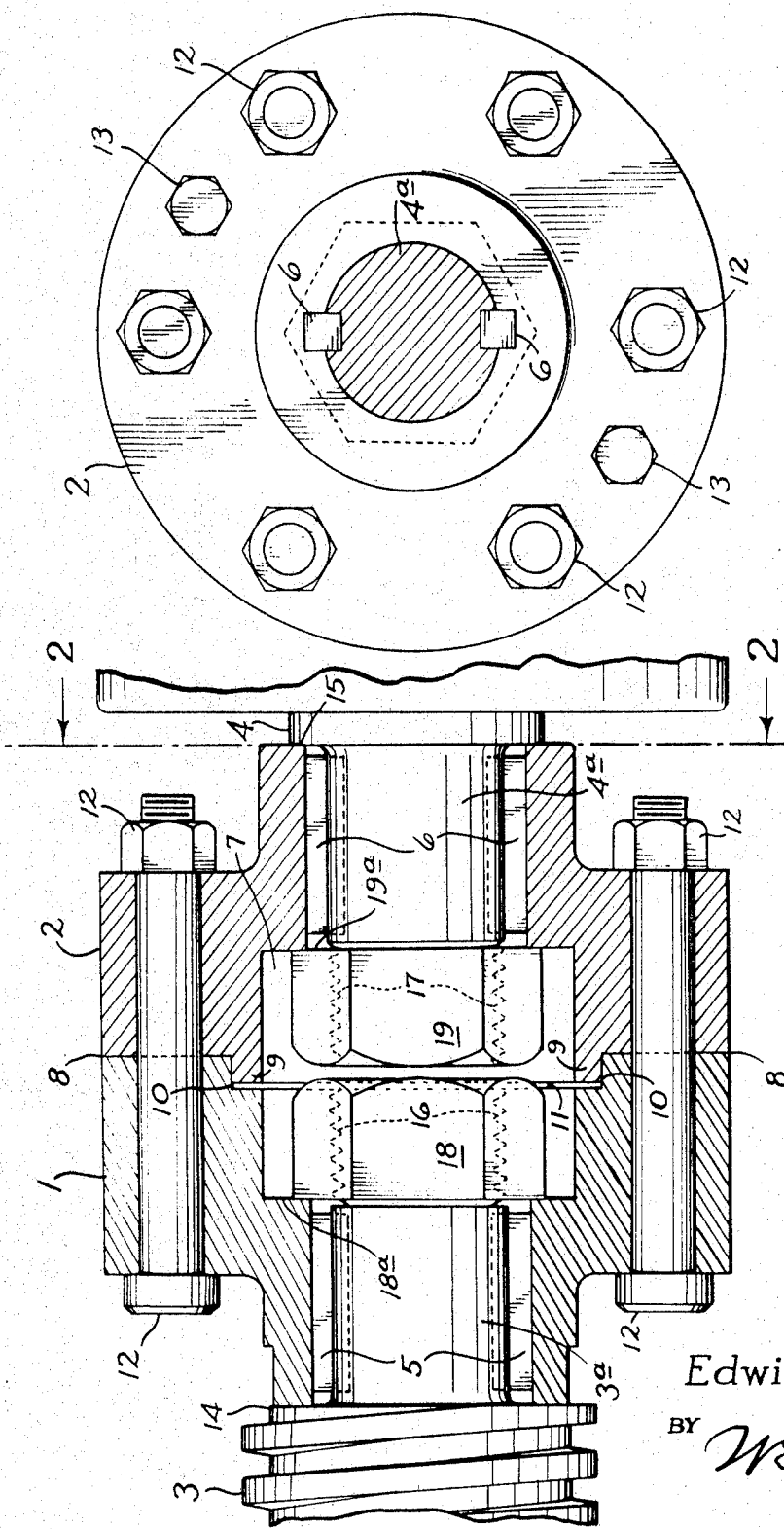

3,466,074
COUPLING FOR VENEER LATHE FEED SCREW
Edwin M. Heth, Portland, Oreg., assignor to Production Machines, Inc., Portland, Oreg., a corporation of Oregon
Filed June 16, 1967, Ser. No. 646,530
Int. Cl. F16b 7/00; F16d 1/00; E21b 17/02
U.S. Cl. 287—129                              3 Claims

ABSTRACT OF THE DISCLOSURE

This invention relates to a coupling for a veneer lathe feed screw required to resist stresses affecting the rigidity and axial alignment of the shaft without producing weakening at the point of joinder. In an organization of this character, forces involving elongation or tension, shortening or compression, twisting due to strains induced by torsion, and misalignment produced by any or all of said forces, are produced. A step joint at a parting line extending transversely of the coupling maintains axial alignment under torsion. Peripheral tensile bolts hold the parts together against separation and are arranged near the periphery of the coupling and a chamber formed within the coupling provides abutments for engaging the opposed faces of nuts, screw-threaded to the feed shaft elements, for inducing face-to-face abutment and to transmit axial compression through said nuts to the shaft sections onto which said nuts are screw-fitted.

---

My invention relates to means for separating a feed screw shaft between its motor and its application of force so that said shaft may be disconnected for servicing. My invention is particularly adapted for use in a veneer lathe.

The stresses imposed upon the parts are severe as is brought out in my United States Patent No. 3,110,330, that issued Nov. 12, 1963, and entitled Mounting for Lathe Spindles. The enormous stresses imposed upon and produced by a feed screw requires that rigidity and axial alinement of the shaft be maintained within close limits. Efforts to joint the shafts have produced a weakening at the point of joinder and have thus not been readily adopted, particularly in big veneer lathes which must exert and resist substantial forces.

I have discovered that a coupling may be coupled between the two shaft elements joined by a removable coupling if the coupling is so constructed that the coupling itself can sustain and transmit the forces without permitting gyration of the axis of rotation and resist the forces developed by torsional effect.

I have determined that this may be accomplished if the coupling parts, and particularly the securing elements, are spaced about a large pitch diameter exceeding that of the screw shaft and are functionally free at the shaft ends joined by such coupling.

A further source of weakness that has been corrected in a coupling defined herein in which the parting line between the coupling halves is formed upon a step joint and all tying stresses imposed upon the coupling halves with each other are transmitted through the periphery of coupling halves which are held against axial misalinement by said step joint, rather than bearing upon the shaft elements per se.

To this end I construct said feed screw coupling with hollow halves in which an internal chamber of cylindrical form is defined, the ends of which bear upon the outer faces of nuts each threaded to one of the coupled shaft ends. By arranging said nuts respectively to have an overall predetermined span, pressure may be exerted through the compressive effect of the tying bolts gripping the coupling halves upon said nuts, which prevent axial movement of the shaft ends with respect to each other and gyration thereof under the extremely high torsional effects imposed by the screw shaft.

The details of a coupling embodying my invention, their functions and the results attained, are hereinafter described with reference to the accompanying drawings, in which:

FIG. 1 is a longitudinal section through a coupling embodying my invention, mounted upon the shaft end portions and lying intermediate shouldered elements upon the feed screw shaft and the power receiving shaft; and FIG. 2 is a transverse section taken on the line 2—2 in FIG. 1, showing the arrangement of the tension producing elements and the keying arrangement between a coupling half and its shaft end which it engages.

A feed screw coupling embodying my invention comprises two separative mated halves 1 and 2, respectively. Mated half 1 engages the stub end of a feed screw 3 and the mated half 2 engages the end of a power transmitting shaft 4. As is noted in FIG. 1, there is substantial space between a threaded stud 16 on the stub end 3a of the feed screw 3 and a similar stud 17 on the stub end 4a of the power transmitting shaft 4. Joining the stud ends is a pair of keys 5 joining the mated half 1 and the stub end 3a of the feed screw 3 and another pair of keys 6 joining the stub end 4a with the mated coupling half 2. Defined within said coupling halves is a cylindrical, formed chamber 7 in which approximately one-half of the overall length thereof lies within each of the mated coupling halves.

Between the mated coupling halves is a parting line 8. A step-joint is provided by a trunnion-shaped protuberance 9 upon the bore of the mated coupling half 2 and a complementary recess 10 formed within the mated coupling half 1. Said trunnion-shaped protuberance 9 and its recess 10 have a close fit, almost a force-fit and the remainder of the parting line is formed with close tolerance so that the coupling halves bear uniformly over the entire surface of the parting line radially outwardly from the trunnion-shaped protuberance 9 and recess 10, respectively. Axially of the trunnnion-shaped protuberance 9 and recess 10, is a space 11 so that axial bearing is about the remainder of the parting line, which is relieved at the middle portion for purposes that will be described hereafter. Six elongated bolt-and-nut tying elements 12 are arranged at predetermined circumferential modules extending through the peripheral portions radially outwardly from the step-joint and substantially midway of the faces of the bearing areas between the step-joint and the periphery of the coupling. The close fit between the trunnion-shaped projection and its recess 9 and 10 holds the coupling to fixed axial relationship with the shafts 3 and 4, respectively, and said fit resists torsion which would produce radial slippage at this point. The close fit takes this stress from the bolt-and-nut tying elements, which thus only serve the purpose of tension members to hold the bearing halves closely in mated position.

I have discovered that a coupled power transmitting shaft of plural sections may be used to attain the same rigidity as would an integral shaft when the pitch diameter of the tying elements exceeds the diametral dimension of the feed screw. I have also determined that the step-joint defined by the trunnion-shaped protuberance and its companion recess, approximates, or is greater than said diametral dimension of said feed screw. Greater radial spacing from the axis of rotation of the companion shafts usually is limited, particularly in a veneer lathe, and said radial spacing is restricted by the proximity of other parts of a veneer lathe.

In such a lathe and for said feed screw, means are provided so that the feed screw may be retracted so that said shaft parts can be separated for servicing. The close fit of the trunnion-shaped protuberance 9 and its recess 10, is sufficiently close so that jacking screws 13 are provided, initially to break the tight joint, particularly after prolonged use. I have found that two jacking screws, spaced diametrically, that is 180° circumferentially, are sufficient for breaking this initial tight fit. They must have an effective operating length so that the trunnion-shaped protuberance 9 may be shifted lengthwise of its recess 10, until they are free of each other after the tying elements 12 have been removed. Then the means (not shown) for retracting the feed screw may be utilized to service the two shafts, or the parts supporting or powered by them for repair, replacement or adjustment.

As is usual, a shoulder 14 on the feed screw and a shoulder 15 on the power transmitting shaft, respectively, are provided to assure absence of play when a coupling is operatively joined. Reference to FIG. 1 shows that when the mated halves of the coupling are tightly in position, the ends of said coupling are in tight abutment with said shoulders, respectively, and the tying elements engage the outer faces of the nuts fitted upon the opposed studs formed upon stub ends 3a and 4a of the feed screw and the power transmitting shaft, respectively. Threaded stud 16 is an axial extension of the stub end 3a, and 17 on the stub end 4a. A threaded nut 18 for stud 16 and a threaded nut 19 for stud 17 are devised to have their spaced sides 18a and 19a fixed a predetermined distance apart. Thus, when the tying connections pull the mating halves together, as is shown in FIG. 1, there is axial engagement of each of the mated coupling halves with the shoulders 14 and 15 and equally tight engagement by the ends of the cylindrical chamber 7 with the space sides 18a and 19a of the nuts 18 and 19, respectively. Thus, all axial compression is exerted upon said nuts and the coupling at its exterior faces with the shoulder portions 14 and 15. As is shown in FIG. 1, the adjacent faces of said nuts are spaced apart so that there will be no interference with said tight connection, and as has been pointed out, the marginal edge of the trunnion-shaped protuberance 9 and its recess 10, affords the same provision against inadvertent engagement at these points which would inhibit a close fit at the selected points noted.

When the foregoing requirements are met, the coupling is mounted so that rotational forces are transmitted through the peripheral portions of the coupling and axial movement is inhibited by the close fit at the peripheral portion of the parting line. The engagement of the coupling with the shouldered portions 14 and 15 and the jointed shaft functions as a rigid integral power transmitting shaft, sustaining all stresses to which said jointed shaft is subject.

Although the coupling that I have described is particularly designed for a feed screw used with a veneer lathe, it has equal function to join other shafts made in related pairs subject to extreme stresses, such as is encountered in veneer lathes.

I claim:
1. A feed screw coupling:
comprising two separable mated halves
removable elongated tying elements joining said coupling halves together in tight face-to-face abutment,
each coupling half having a bore of sufficient size to encircle loosely and to be keyed to a stub end of axially alined paired power transmission shaft elements, one of which is a feed screw, each of said paired power transmission shafts terminating in a threaded, axially alined integral stud element,
a threaded nut on each of said stud elements, each nut having a greater diameter than that of its paired power shaft,
a cylindrical chamber encompassed within said separable coupling halves and having a parting line adjacent the transverse midline of said chamber element,
a complementary mated non-planar step-joint formed at said parting line with said step-joint having a diameter substantially equal to the diameter of said feed screw,
said cylindrical chamber having a fixed axial dimension to produce face-to-face abutment and axial compression with the outermost faces of said nuts, respectively, when the coupling halves are pulled into face-to-face engagement at said parting line.

2. The organization defined in claim 1 in which the removable tying elements are elongated bolt-and-nut elements.

3. The organization defined in claim 1 in which the tying elements are plural in number and lying in a circle having a diameter at least equal to the diameter of the encompassed feed screw.

References Cited

UNITED STATES PATENTS

| | | | |
|---|---|---|---|
| 923,633 | 6/1909 | Edison | 287—129 |
| 1,025,425 | 5/1912 | Robeson et al. | |
| 1,109,836 | 9/1914 | Hanson | 287—130 |
| 2,617,672 | 11/1952 | Nichols. | |

FOREIGN PATENTS

| | | |
|---|---|---|
| 718,666 | 3/1942 | Germany. |
| 977,823 | 11/1950 | France. |
| 651,188 | 3/1951 | Great Britain. |

CARL W. TOMLIN, Primary Examiner

ANDREW V. KUNDRAT, Assistant Examiner

U.S. Cl. X.R.

144—209